United States Patent [19]

Hamilton et al.

[11] 4,159,264

[45] Jun. 26, 1979

[54] AUTOMATIC CONTROL OF AZO COUPLING PROCESSES IN THE MANUFACTURE OF AZO PIGMENTS

[75] Inventors: Alexander Hamilton; Colin Nelson, both of Glasgow, Scotland

[73] Assignee: Ciba-Geigy Corporation, Ardsley, N.Y.

[21] Appl. No.: 837,654

[22] Filed: Sep. 29, 1977

Related U.S. Application Data

[63] Continuation of Ser. No. 711,324, Aug. 3, 1976, abandoned.

[30] Foreign Application Priority Data

Aug. 9, 1975 [GB] United Kingdom ............... 33284/75

[51] Int. Cl.$^2$ ...................... C09B 29/00; C09B 31/00; C09B 31/10; C09B 31/14
[52] U.S. Cl. .................... 260/155; 260/144; 260/152; 260/154; 260/157; 260/161; 260/162; 260/163; 260/176; 260/181; 260/193; 260/197; 260/202; 260/203; 260/204
[58] Field of Search ............... 260/152, 154, 155, 156, 260/157, 158, 160, 162, 163, 176, 180, 181, 193, 197, 202, 203, 204, 205, 206, 207, 207.1, 144 P

[56] References Cited

FOREIGN PATENT DOCUMENTS

| | | |
|---|---|---|
| 1934388 | 3/1971 | Fed. Rep. of Germany ........... 260/144 |
| 599608 | 3/1948 | United Kingdom ..................... 260/161 |
| 1058017 | 2/1967 | United Kingdom ..................... 260/193 |
| 1296720 | 11/1972 | United Kingdom ..................... 260/144 |
| 1339068 | 11/1973 | United Kingdom ..................... 260/176 |

*Primary Examiner*—Floyd D. Higel
*Attorney, Agent, or Firm*—Joseph F. DiPrima

[57] ABSTRACT

Azo pigment coupling process in which the amount of excess diazo or coupling component is continuously monitored and addition of diazo component or coupling component to the reaction is automatically controlled by means of an automatic chemical analyzer which incorporates a dialyser module. The process involves a method of automatically controlling the coupling reaction by a continuous-flow chemical analyzer which continuously samples the reaction mixture and analyzes it for unreacted diazo or coupling component by dialysis and colorimetry, and automatically adjusts the rate of addition of this component to the reaction mixture to keep the concentration of unreacted component within a pre-set range during the period of the reaction.

9 Claims, 1 Drawing Figure

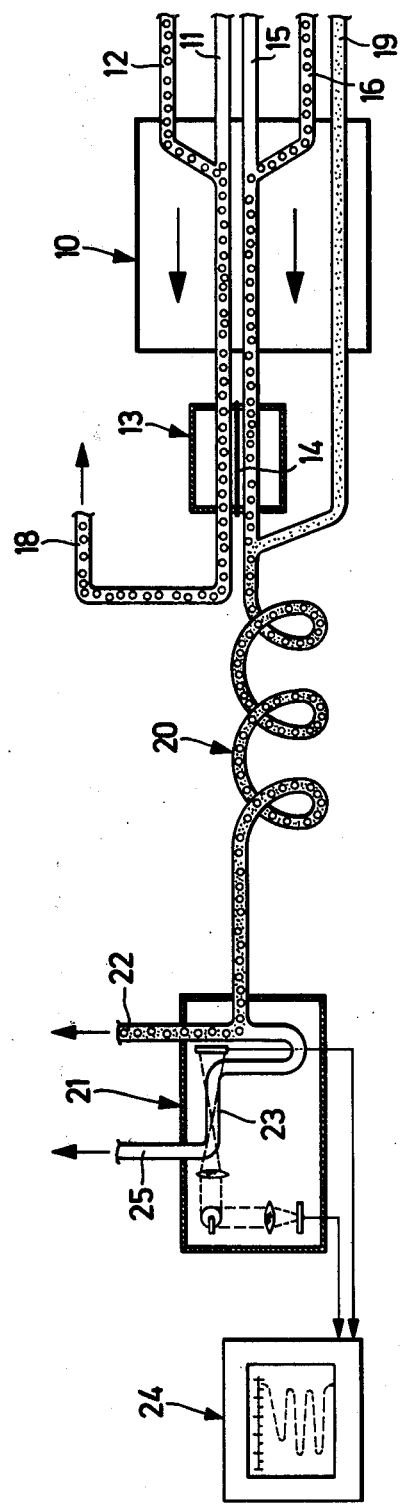

AUTOMATIC CONTROL OF AZO COUPLING PROCESSES IN THE MANUFACTURE OF AZO PIGMENTS

This is a continuation of application Ser. No. 711,324, filed on Aug. 3, 1976, and now abandoned.

The present invention relates to the preparation of azo pigments and more particularly to a method for the automatic control of azo coupling processes in the manufacture of azo pigments.

In the well-known azo coupling process a diazonium salt is reacted with a suitable coupling component to give an azo compound as illustrated by the following equation:

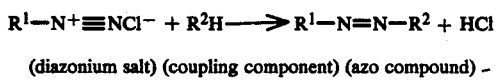

(diazonium salt) (coupling component) (azo compound)

wherein $R^1$ and $R^2$ are suitable radicals.

The reaction is normally carried out in aqueous conditions and proceeds almost quantitatively. It is important that the two components come together in the correct ratio otherwise quality of the final product suffers. If too much diazonium salt is added the excess which is usually fairly unstable can give rise to decomposition products which usually cause dirtiness of shade. If too much of the coupling component is added this is either washed down the drain during the final filtration and so is wasted, or it is left in the product where it can cause colouristic weakness or other property defects.

The coupling reaction in azo pigment manufacture is carried out in three main ways.

(1) The diazonium salt, as an aqueous solution or suspension, is run into a solution or suspension of the coupling component. The pH is controlled within certain limits, specific for each pigment, either by having a buffering agent present or by continuously measuring the pH with a pH meter and adding acid or alkali to maintain the pH within the prescribed limits.

(2) The coupling component solution is run into a solution or suspension of the diazonium salt. The pH in this case is normally controlled by a buffering agent added to the diazonium salt.

(3) The diazo solution or suspension and coupling component solution are added together to the reaction vessel controlling the rates normally so that the two components are always present together in the correct ratio to give complete reaction. The pH is monitored with a pH meter and controlled by the addition of acid or alkali as required.

Control of the coupling process is normally carried out manually using chemical spot tests to check on the progress of the reaction. The operator carries out these tests at regular intervals during the reaction and manually adjusts the valves controlling the additions of the reagents to give the required conditions. Much depends on the operator's skill and application as to how well this is carried out and it is inevitable that variations occur. Operating under batchwise conditions these variations can usually be accommodated by modifying the process from batch to batch to compensate for them. Working on a continuous basis this becomes impossible and it is necessary to maintain reaction conditions constant in order to obtain consistent quality in the product.

The automatic control of azo coupling has been described in (a) Chimia 15—1961—January, pages 156 to 163 in which excess of diazo component is detected by a potentiometric method using a quinhydrone electrode.

(b) British Patent specification No. 1,296,720 which describes the use of a polarographic method for the control of azo coupling reactions again by the detection of excess of the diazo component.

The presence of excess diazo component during an azo coupling process is often undesirable since the cleanliness of shade of the product can be affected.

We have devised a system which gives a continuous quantitative indication of conditions in the reaction vessel by using an automatic chemical analyser incorporating a dialyser module to continuously monitor the amount of excess of the diazo or coupling component in the reaction. This system has the advantage of avoiding the presence of excess diazo component in the coupling process in those cases when this would be detrimental to the product.

In certain couplings, however, notably in cases when the solubility of the coupling component is very low, an excess of diazo component is present throughout coupling and in these cases the reaction can be monitored by continuously determining the concentration of diazo component present. If, an excess of diazo component persists the analyzer will show positively whether or not the reaction has stopped and whether or not it is necessary to add further coupling component to complete the reaction.

According to the present invention there is provided an azo pigment coupling process in which the amount of excess diazo or coupling component is continuously monitored and the addition of diazo component or coupling component to the reaction is automatically controlled by means of an automatic chemical analyser incorporating a dialyser module.

The diazonium salt used in the coupling process may be prepared from any diazotisable amine which on coupling with a suitable coupling component results in a water-insoluble azo pigment. Such diazotisable amines are for example primary aromatic monoamines or diamines derived from benzene, or from biphenyl, or from condensed benzenoid structures such as naphthalene or anthracene, or from structures in which benzene is condensed with a heterocyclic ring such as quinoline. The carbocyclic or heterocyclic aromatic nucleus of these amines can be unsubstituted, or substituted with one or more of the following groups: alkyl, alkoxy, halogeno, nitro, cyano, acylamino, sulphonamido, carboxy-alkyl, and carboxylic acid. Suitable amines may be mono-nitroanilines, dinitroanilines, nitrotoluidines, nitroanisidines, mono-chloranilines, dichloranilines, trichloranilines, chlorotoluidines, chloranisidines, chloronitroanilines, benzidine, dichlorobenzidines, tetrachlorbenzidines, tolidines, dianisidines and dichlordianisidines, N-phenyl-3-amino-phthalimide, 5-amino-6-methyl-benzimidazolone, 6-methyl-7-amino-phenomorpholine (3), 4-methyl-6-chloro-7-aminoquinolone, 4(-2'-methoxy-4'-amino-5'-chlorophenyl-amino)-quinazoline, 3-aminodibenzofuran.

The diazonium salt may, if desired, be prepared by the continuous process described in our co-pending patent application No. 33614/75.

The coupling component may be any coupling component normally used for the production of azo pigments which is able to dissolve to some extent in the coupling medium and which couples with a suitable diazonium salt to give a water-insoluble product. Such components are for example acetoacetanilide and derivatives thereof such as acetoacet-2-toluidide, acetoacet-4-toluidide, acetoacet-2-anisidide, acetoacet-2-chloranilide, acetoacet-2:4-dimethylanilide, acetoacet-2:5-dimethoxy-4-chloranilide; 1-aryl pyrazolones such as 1-phenyl-3-methyl-5-pyrazolone, 1-4'-tolyl-3-methyl-5-pyrazolone, and 1-phenyl-3-carbethoxy-5-pyrazolone; 2-naphthol; 2-hydroxy-3-naphthoic acid and arylides thereof such as (2',3'-hydroxynaphthoylamino)-benzene, 1-(2',3'-hydroxynaphthoylamino)-2-methyl benzene, 1-(2',3'hydroxynaphthoylamino)-2,4-dimethoxy-5-chloro-benzene, and 1-(2',3' hydroxynaphthoylamino)-2-methyl-5-chloro-benzene, 4-hydroxycoumarin, barbituric acid, 2,4-dihydroxyquinoline, 4-hydroxy-N-methyl-quinoline, 4-methyl-7-acetoacetamido-quinolone, 7-acetoacetamido-phenomorpholone (3), 5-acetoacetamido-benzimidazolone.

An example of a suitable automatic chemical analyser is the Technicon AutoAnalyser (AutoAnalyser is a Registered Trademark).

The AutoAnalyser is a train of interconnected modules that automate the step-by-step procedures of manual analysis. In AutoAnalysis, chemical reactions take place in continuously flowing air-segmented streams. The flow of streams is directed through tubing from module to module, each of which automatically carries out a different analytical function such as sampling of unknowns and standards; metering of reagents; purification and filtration; heating and incubation and detection and recording.

The process of the present invention is further described by way of Example with reference to and as illustrated by FIG. 1 of the drawings accompanying the provisional specification which is a schematic flow sketch.

A proportionating pump 10 continuously samples the pigment slurry through channel 11 from the reaction vessel. Air in channel 12 is pumped in and this segments the pigment slurry in channel 11 which then passes through a dialyser 13 on one side of the dialyser membrane 14 before returning via tube 18 to the reaction vessel. At the same time the pump 10 circulates a buffer solution through channel 15 segmented with air in channel 16 to the other side of the dialyser membrane 14. If an excess of diazo or coupling component is present it diffuses through the dialyser membrane 14 from the sample stream into the buffer solution stream in direct proportion to its concentration in the sample stream. Thus as the amount of excess diazo or coupling component in the reaction vessel varies during the reaction so the amount diffusing into the buffer solution varies directly. A suitable colorimetric reagent metered by the proportionating pump 10 in a channel 19 mixes with the buffer solution carrying the diazo or coupling component emerging from the dialyser 13 in channel 15 in a mixing coil 20 to form a coloured solution, usually a water-soluble azo dyestuff. The coloured solution passes to the colorimeter 21 where the air bubbles are removed through tube 22 to provide a continuous stream which passes into the flow-through colorimeter cell 23 in which the strength of the coloured solution is continuously measured and this is continuously recorded on a chart recorder 24. The coloured solution leaves the colorimeter by an effluent pipe 25 which is connected to the proportionating pump 10 to ensure efficient flow through.

The output signal from the colorimeter is then used to control the addition of one or other of the components to the reaction vessel by continuously regulating the valves through which the components are added to the reaction vessel.

The following Examples further illustrate the present invention.

EXAMPLE 1

In the preparation of Colour Index Pigment Yellow 12 in which a solution of tetrazotised 3.3'-dichlorbenzidine is added to a suspension of acetoacetanilide in a stirred coupling vessel at a pH controlled between 4.0 and 6.5 the amount of acetoacetanilide present in the coupling bath is continuously monitored by pumping a sample stream from the reactor through channel 11 on the AutoAnalyser to the dialyser 13. A disodium phosphate buffer solution is pumped through channel 15 which picks up acetoacetanilide diffusing through the dialyser membrane 14. The buffer solution containing acetoacetanilide is mixed in coil 20 with a solution of tetrazotised benzidine-2.2'-disulphonic acid added through channel 19. The yellow dyestuff solution formed passes to the colorimeter 21 where the concentration is measured at a wavelength of 410 nm and recorded on the recorder 24. An output signal from the recorder can be used to regulate the supply of tetrazo solution to the reaction.

When the concentration of acetoacetanilide present drops below a pre-set value on the recorder the valve through which the tetrazo solution being added is automatically closed and the presence of excess tetrazo in the reaction is avoided.

EXAMPLE 2

In the preparation of Colour Index Pigment Yellow 13 a solution of tetrazotised 3.3'-dichlorbenzidine and a solution of acetoacet-2:4-xylidide as its sodium salt are added simultaneously to a coupling vessel at a pH controlled throughout at 4.2–4.5. In order to ensure that a constant small excess of acetoacet-2:4-xylidide is present throughout coupling a sample stream from the coupling vessel is passed through the AutoAnalyser and the acetoacet-2:4-xylidide which passes through the dialysis membrane is picked up in a disodium phosphate solution and is reacted with tetrazotised benzidine-2.2'-disulphonic acid to give a water-soluble yellow dyestuff which is measuring on the colorimeter at 410 nm. An output signal from the recorder can be used to automatically regulate either the valve through which the tetrazo solution is being added or the valve through which the acetoacet-2:4-xylidide solution is being added so that the excess of the coupling component is maintained at a fixed value throughout the coupling and the presence of excess tetrazo compound is avoided.

EXAMPLE 3

In the preparation of a red azo pigment intermediate a solution of diazotised 2:5-dichloroaniline and a solution of 2-hydroxy-3-naphthoic acid as its sodium salt are added simultaneously to a coupling vessel maintaining the pH at 8.0 throughout. A sample stream from the reaction is passed through the AutoAnalyser and the 2-hydroxy-3-naphthoic acid which passes through the dialysis membrane is picked up in a water stream and reacted with acidic ferric chloride solution to give a blue coloration measured at 570 nm on the colorimeter. An output from the recorder is used to regulate the rate of addition of 2-hydroxy-3-naphthoic acid to the reaction and so the excess present throughout can be automatically controlled at a fixed value.

EXAMPLES 4 to 42

Preparation of the water-insoluble azo pigments listed in Table 1 can be carried out by controlling the excess of diazo component or coupling component in the reaction medium of the coupling process as required using the AutoAnalyser in a similar manner to that described in the preceding Examples 1 to 3.

TABLE 1

| EXAMPLE | DIAZOTISED AMINE | COUPLING COMPONENT | COLOUR INDEX NO. |
|---|---|---|---|
| 4 | 4-nitroaniline | acetoacetanilide | Pigment Yellow 4 |
| 5 | 3-nitro-4-aminotoluene | acetoacetanilide | Pigment Yellow 1 |
| 6 | 5-nitro-2-aminoanisole | acetoacet-2-methoxyanilide | Pigment Yellow 74 |
| 7 | 4-chloro-2-nitroaniline | acetoacet-2-chloranilide | Pigment Yellow 3 |
| 8 | 4-chloro-2-nitroaniline | acetoacet-2-methoxyanilide | Pigment Yellow 73 |
| 9 | 4-chloro-2-nitroaniline | acetoacet-2-methyl-4-chloranilide | — |
| 10 | 2.5-dichloraniline | 1-phenyl-3-methyl-5-pyrazolono | Pigment Yellow 10 |
| 11 | 5-chloro-2-aminotoluene | acetoacet-2.5-dimethoxy-4-chloranilide | Pigment Yellow 49 |
| 12 | 3-nitro-4-aminoanisole | acetoacet-2-anisidide | Pigment Yellow 65 |
| 13 | 5-nitro-2-aminoanisole | acetoacet-2-methoxy-5-chloranilide | — |
| 14 | 5-chlor-2-aminotoluene | acetoacet-α-naphthylamide | — |
| 15 | 4-chloranilino | 2:4-dihydroxyquinoline | — |
| 16 | 3.3'-dichlorbenzidino | acetoacetonilido | Pigment Yellow 12 |
| 17 | 3,3'-dichlorbenzidine | acetoacet-2-toluidide | Pigment Yellow 14 |
| 18 | 3.3'-dichlorbenzidine | acetoacet-4-toluidide | Pigment Yellow 55 |
| 19 | 3.3'-dichlorbenzidine | acetoacet-2-anisidide | Pigment Yellow 17 |
| 20 | 3.3'-dichlorbenzidine | acetoacet-2-chloranilido | Pigment Yellow 63 |
| 21 | 3.3'-dichlorbenzidine | acetoacet-2:4-dimethylanilide | Pigment Yellow 13 |
| 22 | 3.3'-dichlorbenzidine | acetoacet-2:5-dimethoxy-4-chloranilide | Pigement Yellow 83 |
| 23 | 2.2'-5.5'-tetra-chlorobenzidine | acetoacet-2.4-dimethyl-anilide | Pigment Yellow 81 |
| 24 | 2.2'-dichloro-5.5'-dimethoxy-benzidine | acetoacet-2:4-dimethyl-anilide | Pigment Yellow 15 |
| 25 | 2:4-dinitroaniline | 2-naphthol | Pigment Orange 5 |
| 26 | 3.3'-dichlorobenzidine | 1-phenyl-3-methyl-5-pyrazoline | Pigment Orange 13 |
| 27 | 3.3'-dichlorbenzidine | 1-4'-tolyl-3-methyl-5-pyrazolone | Pigment Orange 34 |
| 28 | 3.3'-dimethoxy-benzidine | acetoacet-2:4-dimethylanilide | Pigment Orange 16 |
| 29 | 4-nitro-aniline | 2-naphthol | Pigment Red 1 |
| 30 | 2.5-dichloroaniline | (2'.3'-hydroxynaphthoylamino)-benzene | Pigment Red 2 |
| 31 | 2.5-dichloraniline | 2-hydroxy-3-naphthoic acid | — |
| 32 | 3-nitro-4-amino-toluene | 2-naphthol | Pigment Red 5 |
| 33 | 2-chloro-4-nitroaniline | 2-naphthol | Pigment Red 4 |
| 34 | 4-chloro-2-nitroaniline | 2-naphthol | Pigment Red 6 |
| 35 | 2-anisidine-4-sulphone diethylamide | 1-(2',3'-hydroxy-naphthoylamino-2.4-dimethoxy-5-chloranilide | Pigment Red 5 |
| 36 | 5-chloro-2-aminotoluene | 1-(2',3'-hydroxy-naphthoylamino)-2-methyl-4-chloranilido | Pigment Red 7 |
| 37 | 4-chloro-2-aminotoluene | 1-(2',3'-hydroxy-naphthoylamino)-2-methyl-5-chloranilido | Pigment Red 11 |
| 38 | 5-nitro-2-aminotoluene | 1-(2',3'-hydroxy-naphthoylamino)-2-methyl-anilide | Pigment Red 12 |
| 39 | 2:4:5-trichloroanilino | 1-(2',3'-hydroxynaphtheylamino)-2-methyl-anilide | Pigment Red 112 |
| 40 | 3.3'-dimethoxy-benzidine | 1-phenyl-3-methyl-5-pyrazolone | Pigment Red 41 |
| 41 | 3.3'-dichlorbenzidine | 1-phenyl-3-carbethoxy-5-pyrazolone | Pigment Red 38 |
| 42 | 3.3'-dimethoxy-benzidine | (2',3'-hydroxy-naphtheylamino)-benzene | Pigment Blue 25 |

What is claimed is:

1. In a continuous process for the manufacture of water-insoluble azo pigments by reacting a diazonium salt and a coupling component where the amount of the diazonium salt in a reaction mixture is monitored by a continual polarographic determination and is automatically adjusted so that there is always a very slight excess of the diazonium salt in the reaction mixture wherein the improvement comprises reacting the diazonium salt and the coupling component where the amount of the coupling component in the reaction mixture is monitored by a continuous dialytic and colorimetric determination and the amounts of both the coupling component and diazonium salt are automatically adjusted so that there is always a slight excess of the coupling component in the reaction mixture.

2. An azo pigment coupling process as claimed in claim 1 in which the diazonium salt used in the coupling process is prepared from any diazotisable amine which on coupling with a suitable coupling component results in a water-insoluble azo pigment.

3. A process as claimed in claim 2 in which the diazotisable amine is a primary aromatic monoamine or diamine derived from benzene, or from biphenyl, or from a condensed benzenoid structure, or from a structure in which benzene is condensed with a heterocyclic ring.

4. A process as claimed in claim 3 in which the carbocyclic or heterocyclic nucleus of the diazotisable amine is unsubstituted, or substituted with one or more alkyl, alkoxy, halogeno, nitro, cyano, acylamino, sulphonamido, carboxy-alkyl, and carboxylic acid groups.

5. A process as claimed in claim 3 in which the diazotisable amine is a mono-nitroaniline, dinitroaniline, nitrotoluidine, nitroanisidine, mono-chloraniline, dichloraniline, trichloraniline, chlorotoluidine, chloroanisidine, chloronitroaniline, benzidine, dichlorbenzidine, tetrachlorbenzidine, tolidine, dianisidine or dichlordianisidine.

6. A process as claimed in claim 1 in which the coupling component is able to dissolve to some extent in the coupling medium and which couples with a suitable diazonium salt to give a water insoluble product.

7. A process as claimed in claim 6 in which the coupling component is acetoacetanilide, acetoacet-2-toluidide, acetoacet-4-toluidide, acetoacet-2-anisidide, acetoacet-2-chloranilide, acetoacet-2:4-dimethylanilide, acetoacet-2:5-dimethoxy-4-chloranilide, 1-phenyl-3-methyl-5-pyrizolone, 1-4'-tolyl-3-methyl-5-pyrazolone, 1-phenyl-3-carbethoxy-5-pyrazolone, 2-naphthol; 2-hydroxy-3-naphthoic acid, (2', 3'-hydroxy-naphthoylamino)-benzene, 1-(2', 3'-hydroxy-naphthoylamino)-2-methyl-benzene, 1-(2', 3'hydroxynaphthoylamino)-2,4-dimethoxy-5-chloro-benzene or 1-(2', 3' hydroxynaphthoylamino)-2-methyl-5-chloro-benzene.

8. A process as claimed in claim 2 in which the diazotisable amine is N-phenyl-3-amino-phthalimide, 5-amino-6-methylbenzimidazolone, 6-methyl-7-aminophenomorpholone (3), 4-methyl-6-chloro-7-aminoquinolone, 4(-2'-methoxy-4'-amino-5'-chlorophenylamino)-quinazoline or 3-aminodibenzofuran.

9. A process as claimed in claim 6 in which the coupling component is 4-hydroxycoumarin, barbituric acid 2,4-dihydroxyquinoline, 4-hydroxy-N-methyl-quinolone, 4-methyl-7-acetoacetamido-quinolone, 7-acetoacetamido-phenomorpholone (3), 5-acetoacetamido-benzimidazolone.

* * * * *